United States Patent [19]

Bitzer

[11] Patent Number: 4,571,696
[45] Date of Patent: Feb. 18, 1986

[54] ELECTRONICALLY CONTROLLED SCREWDRIVER WITH QUALITY CHECK INDICATOR

[75] Inventor: Rainer Bitzer, Weissach, Fed. Rep. of Germany

[73] Assignee: Robert Bosch GmbH, Stuttgart, Fed. Rep. of Germany

[21] Appl. No.: 494,272

[22] Filed: May 13, 1983

[30] Foreign Application Priority Data

May 19, 1982 [DE] Fed. Rep. of Germany ....... 3218928

[51] Int. Cl.⁴ ........................ B25B 23/14; G06G 7/48
[52] U.S. Cl. .................................... 364/552; 29/407; 81/467; 81/480; 173/12
[58] Field of Search ................................ 364/550–552, 364/505, 506; 235/420; 29/240, 407, 709; 377/52; 81/430, 433, 467, 480; 173/164, 12

[56] References Cited

U.S. PATENT DOCUMENTS

| 4,104,778 | 8/1978 | Vliet | 29/407 |
| 4,106,176 | 8/1978 | Rice et al. | 29/407 |
| 4,179,786 | 12/1979 | Eshghy | 29/240 X |
| 4,284,955 | 8/1981 | Beno et al. | 377/52 X |
| 4,344,216 | 8/1982 | Finkelston | 364/506 X |
| 4,413,396 | 11/1983 | Wallace et al. | 29/407 |

Primary Examiner—Gary Chin
Assistant Examiner—Kevin J. Teska
Attorney, Agent, or Firm—Frishauf, Holtz, Goodman & Woodward

[57] ABSTRACT

Backwards counters (11,12) are preset with upper and lower limits of the angle through which screws are to be driven, the counters being loaded when a certain value of torque is reached, at which time counting down begins with each increment of rotary angle. When the operation is completed in the usual way after reaching a limit value of torque, the increasing interval between count pulses is detected by a delay circuit (7) and counting is stopped. A logic circuit (15) shows whether the screw connection is satisfactory or whether it is underdriven or overdriven.

7 Claims, 7 Drawing Figures

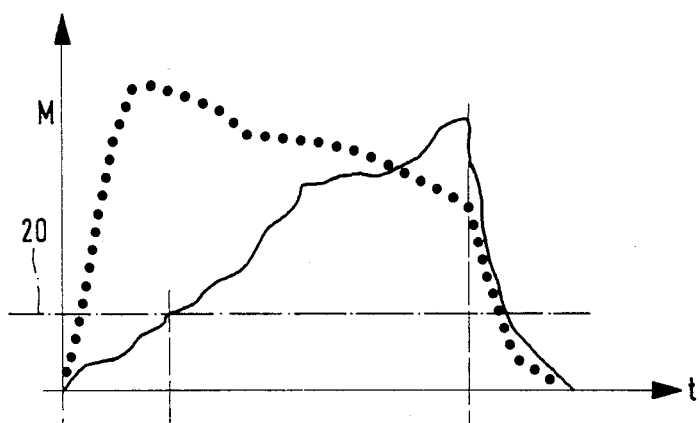

4,571,696

ELECTRONICALLY CONTROLLED SCREWDRIVER WITH QUALITY CHECK INDICATOR

This invention concerns a screwdriving tool for carrying out repetitive screwdriving operations under automatic control of the amount of driving, more particularly a tool of the kind equipped with torque and cumulative angle transducers and provided with an evaluation circuit for determining when the screwdriving operation has been completed.

Screwdriving tools are known in which the individual driving operations are computer controlled. In such known systems, the angle of rotation and the torque is measured and monitored by a computer in which there is provided a prescribed final torque. The computer checks, when that torque is reached, whether the screwing-in angle lies within some lower or higher limit. The lower and upper limits are inserted by means of a keyboard. If the angle of rotation is below or above predetermined limits, the particular screwing-in operation is not in order and a trouble signal is produced. Since the entire screwdriving apparatus is computer controlled, it is relatively expensive and not applicable to simple assembly operation using screws, since the investments required for complete computer control are too high.

THE INVENTION

It is an object of the present invention to provide an automatically controlled power screwdriver that operates reliably with simple digital electronics in the control circuit and provides reliable quality checks without requiring the concentrated processing capabilities of a computer or microcomputer.

Briefly, the evaluation circuit for the angle and torque signals contains limit value counters for the screwdriving shaft, the counters being presettable at appropriate initial values and being caused to start counting after a predetermined value of torque is reached until a predetermined count condition is passed by the particular counter, when a switching signal is produced for evaluating the operation result.

The screwdriving system according to the invention has the advantage that only a few commonly available electronic components are needed in order to check whether each of the screwdriving operations has been correctly performed. It is therefore possible to provide the equipment at an economical price so that even the monitoring of very simple screwdriving operations becomes cost-effective.

It is particularly useful to constitute the counters as backwards counters and to have the switching signal produced when the counter goes through zero, after which the switching signal is stored in a flipflop. In this manner, a particularly simple constitution of the system for evaluating total angle of rotation is obtained, because most of the counters produced by integrated circuit technology have outputs which produce a pulse when the count condition goes through zero. Supplementary circuits for that purpose are accordingly not necessary.

In order to obtain an unambiguous indication at the output display, it is desirable to set the flipflops which store the zero-passage signals of the counters when a prescribed torque threshold value is reached. The flipflops are then reset by the carry signal (as the zero-passage signal is generally known) of the respective corresponding counters.

For increasing protection of the circuit against disturbance, it is also advantageous to free the count inputs of the counters only when the corresponding flipflops are set and block those inputs the rest of the time.

In order to obtain a simple switch-off condition for the counters, a delay circuit is provided which breaks off the counting process when repetition period of count pulses exceeds a certain time duration. The count conditions preset at count start, determined by the angle value limits can be set at any desired values most simply by means of a multibit binary coding switch.

THE DRAWING

The invention is further described by way of illustrative example with reference to the annexed drawing, in which:

FIG. 1 is a schematic circuit diagram of the electronic system of an embodiment of the invention, and FIGS. 2a, 2b, 2c, 2d, 2e and 2f are timing graphs on a common horizontal time scale for explaining the operation of the circuit of FIG. 1.

DESCRIPTION OF THE ILLUSTRATED EMBODIMENT

Figure 1:
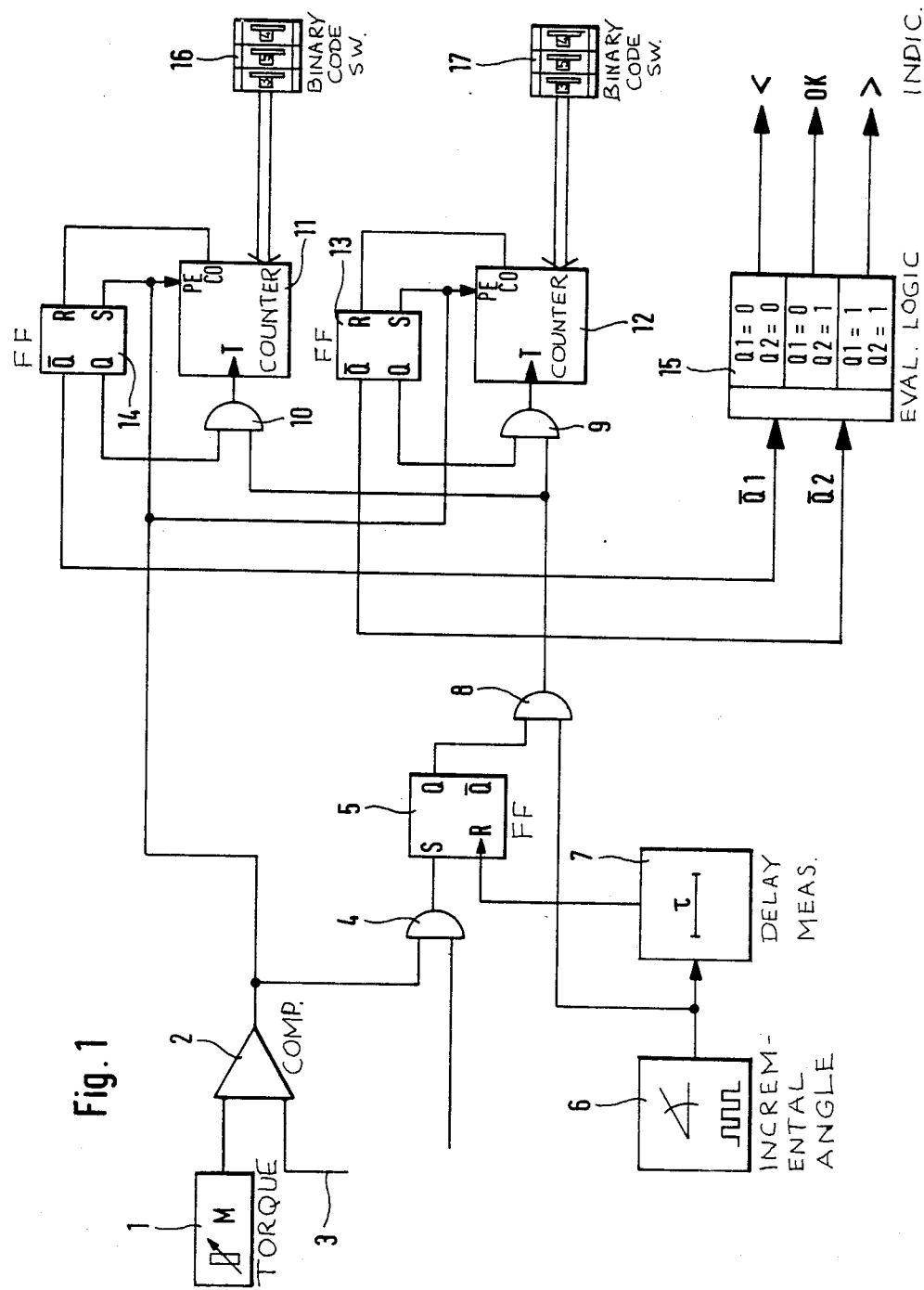

FIG. 1 shows a torque transducer 1 connected in an evaluation circuit by which the torque occurring in the screwdriving device is measurable. The analog output signal of the torque transducer is supplied to a comparator 2 that has another input 3 at which a voltage is applied that serves as a threshold voltage and represents a predetermined value of torque. The output of the comparator 2 leads to one input of an AND-gate 4. The other input of the AND-gate 4 is connected to a screwdriver control which provides a logic "one" signal when the screwdriver is switched on. The output of the AND-gate 4 leads to the set input of a flipflop 5. The output of the flipflop 5 is connected with one input of a second AND-gate 8.

The screwdriving device is also provided with another transducer 6 which is an incremental rotary angle transducer which produces a rectangular pulse for every unit of angle as the screwdriver shaft turns. The output signal of the transducer 6 is supplied on the one hand to one input of the AND-gate 8 and on the other hand to a delay circuit 7. The circuit 7 produces a signal when the period of repetition of the output pulses of the transducer 6 goes below a prescribed value. This signal is supplied to the dyanmic reset input of the flipflop 5. In the simplest case, the time delay circuit 7 can be constituted as a monostable multivibrator (monoflop) that is set, for example, with the rising flank of each pulse of the transducer 6.

The output signal of the AND-gate 8 is supplied to one input of each of the AND-gates 9 and 10. The output of the AND-gate 10 is connected to the count input of a counter 11. The output of the AND-gate 9 is connected to the count input of the counter 12. The reversible counters of type designation CD 4510 available from the Motorola Company are particularly well-suited for service as the counters 11 and 12 of FIG. 1. These counters have the property that their count condition can be loaded by means of a PE (preset enable) signal. They also provide a signal at the CO (carry out) output when an overflow occurs. The counters 11 and 12 are connected as backwards counters. The output of the comparator 2 is connected to the PE inputs of the respective counters 11 and 12. The output of the comparator 2 is also supplied to the respective set inputs of the flipflops 13 and 14. The CO output of the counter 11 is connected to the reset input of the flipflop 14, while the CO output of the counter 12 is connected to the reset input of the flipflop 13. The output of the flipflop 13 is connected with another input, not yet mentioned, of the AND-gate 9 and the output of the flipflop 14 is likewise connected to another input, not yet mentioned, of the AND-gate 10.

Coding switches 16 and 17 are connected to the respective data inputs of the counters 11 and 12 for providing the necessary preset values. The negating outputs of the respective flipflops 13 and 14 are connected to the inputs of an evaluating logic circuit 15. The latter negates the input signals and supplies a first signal when both these input values are zero, a second signal when the first value is zero and the second value is one, and a third signal when both values are one.

The manner of operation of the circuit of FIG. 1 is best explained with reference to FIGS. 2a–2f. FIG. 2a shows a typical screwdriving operation. The rotary speed of the screwdriver shaft is shown by the dotted line, while the solid line shows the typical course of the torque, as it can be measured in the form of a voltage at the output of the torque transducer 1. A threshold value 20 is shown in FIG. 2a that is set at the input 3 of the comparator 2 of FIG. 1. When the torque during a screwing-in operation reaches the prescribed threshold value, the comparator provides a pulse in response to which the screwing-in angle measurement beings. This pulse, which is shown in FIG. 2b, sets the flipflop 5 through the AND-gate 4, provided that the screwdriver is in operation. It is not possible to set the flipflop 5 in the case of any disturbances in the switching off of the screwdriver when the torque is in the neighborhood of the threshold value.

As FIG. 2c shows, the screwdriver is switched on only until the maximum torque is reached. By the setting of the flipflop 5, provision is made for connecting the pulses of the incremental angle transducer 6 through the AND-gate 8. These pulses are shown in highly schematic form in FIG. 2d.

The flipflops 13 and 14 are also set by the pulse at the output of the comparator 2. The latter also provides the signal at the PE inputs of the counters 11 and 12, which has the effect that the values set in the respective coding switches 16 and 17 are taken over into the counters 11 and 12 respectively. The AND-gates 9 and 10 are enabled by the output signals of the flipflops 13 and 14, so that the signals of the incremental angle transducer 6 are applied to the respective count inputs of the counters 11 and 12. The latter now count backwards. Once the screwing-in operation is completed, the screwdriver then switches off at a certain torque. By overrun effect, the screw is still somewhat further screwed in, while the angular velocity, however, drops sharply. The length of the repetition period of the pulses from the transducer 6 accordingly becomes longer and longer. This is recognized by the delay circuit 7, which is reset so long as the period length exceeds a predetermined duration. The delay circuit is set by the first pulses of the incremental angle transducer 6. The trailing edge of the delay circuit 7 resets the flipflop 5 and further pulses of the transducer 6 can then no longer pass through the AND-gate 8. The time course of the delay circuit 7 is shown in FIG. 2e. Consequently, no more count pulses can reach the counting inputs of the counters 11 and 12. The effective gate time for the counters 11 and 12 accordingly begins with the pulse provided by the comparator 2 and ends with the resetting of the flipflop 5, as shown in FIG. 2f.

The counter 11 takes over the upper angle limit value from the coding switch 16, while the counter 12 takes over the lower angle limit value from the coding switch 17 when the pulse produced by the comparator 2 appears.

An operation of the screwdriver is accordingly shown to have been performed in order if at the time a prescribed torque value is reached, the screwing-in angle of the screw lies between the prescribed upper and lower limits. The CO outputs of the counters 11 and 12 serve for monitoring this criterion. When reaching the counter condition zero, each of the backwards counters provide a signal at its CO output which resets the corresponding one of the flipflops 13 and 14. The respective positive outputs of these flipflops, at the same time, block the gates 9 and 10 respectively, so that further counting after the zero count condition is reached cannot take place. In consequence any disturbing pulses cannot lead to a falsification of the count results. The outputs of the flipflops 13 and 14 can be regarded as status signals, because they show whether or not the respective counters have counted down to zero. The state of these signals are then decoded by the circuit 15 to provide the desired output signals.

If neither of the two counters reaches the value zero, both of the flipflops 13 and 14 remain set. This means that the screwing-in angle was too small, because the lower limit value of angle was not passed. In this case the screw connection is not in order and the screwing-in angle too small. If the backwards counter 12 has reached the value zero and reset the flipflop 13, but the counter 11 has not counted to zero, the screw connection is in order, because the screwing-in angle lies within the tolerance range set into the system. If both the backwards counter 12 and the backwards counter 13 reach the value zero, both the flipflops 13 and 14 are reset. In this case the screwing-in angle is too great and both the lower and the upper limit values have been overstepped. In consequence expansion of the screw by plastic deformation is to be feared. The output signals of the evaluation circuit 15 can easily provide, by lamp signals for example, an indication of the state of each screw connection for control of an assembly operation and its apparatus. The complete circuit according to the invention thus makes possible, by means of commercially available components, a simple and economical evaluation of the screw fastenings as they are produced.

Although the invention has been described with reference to a particular illustrative embodiment, it will be understood that variations and modifications are possible within the inventive concept.

A preferred method of shutting of the screwdriver after an upper limit torque is reached, which is usable for that purpose in connection with the present invention, is disclosed in U.S. Pat. No. 4,502,549 to Friedrich et al., on Mar. 5, 1985, and owned by the Assingee of this application.

I claim:

1. Electronically controlled power-screwdriver equipment including a motor energized by a power circuit and having a screwdriver shaft, an angle-of-turn transducer for producing pulses at successive equal increments of angle of rotation of said shaft, a torque transducer for producing an electric signal representative of torque applied to said shaft, a triggering circuit for producing a trigger signal when a first predetermined value of torque applied by said shaft is reached, and means for stopping said shaft by a process that allows a brief interval of shaft deceleration in the stopping of said shaft following a trigger signal from said triggering circuit, said power-screwdriver equipment further comprising:

means responsive to said torque transducer for producing a count start signal when a second predetermined value of torque applied by said shaft is reached;

first and second counters connected to start counting from predetermined initial count states in response to said count start signal, in step with said pulses produced by said angle-of-turn transducer;

means for detecting a predetermined stage of said shaft deceleration following said trigger signal, and means for storing and displaying signals indicative of whether predetermined values of count have respectively been reached in said counters at an instant of time at which said stage of said shaft deceleration is detected.

2. Power-screwdriver according to claim 1 in which said counters are backwards counters constituted so as to provide a signal when the count state passes through zero, in which said predetermined initial count states are first and second initial count states representative of lower and upper limits of extent of screwdriving and means are provided for loading said first and second initial count states respectively into said first and second counters in response to the appearance of said count start signal, in which said detecting means includes a delay circuit connected for comparing a predetermined delay interval with the period of repetition of said pulses provided by said angle-of-turn transducer and thereby determining said instant of time when the period of repetition of said pulses exceeds said predetermined delay interval and in which said means for storing and displaying signals is constituted to operate in response to whether at said instant of time determined by said detecting means said first counter and/or said second counter had provided a signal responsive to passage of its count state through zero.

3. Power-screwdriver equipment according to claim 1 in which means are provided for preventing said count start signal from being produced when the power circuit of said motor of said power-screwdriver equipment is not switched on and thereby preventing a false count start signal in operations of the equipment which are interrupted just before said count start signal is produced.

4. Power-screwdriver equipment according to claim 2 in which said means for storing and displaying signals include flip-flops respectively responsive to said zero-passage output signals of said counters and means for setting said flip-flops in response to said count start signal and for resetting said signal in response to operation of said detecting means.

5. Power-screwdriver equipment according to claim 4 in which said counters are connected so that their counting inputs are disabled unless said flip-flops connected thereto are respectively set.

6. Power-screwdriver equipment according to claim 2 in which said delay circuit is a monoflop which is repetitively set by said pulses produced by said angle-of-turn transducer.

7. Power-screwdriver equipment according to claim 2 in which said first and second predetermined initial count states are set by first and second multibit coding switches.

* * * * *